United States Patent Office 3,295,314
Patented Jan. 3, 1967

3,295,314
LIQUID FUEL SUPPLY SYSTEMS FOR GAS TURBINES
Robert Barry Matthews, Chandler's Ford, Eastleigh, and John Parkin Whitehead, Fareham, England, assignors to Plessey-UK Limited, Ilford, England, a British company
Filed May 15, 1964, Ser. No. 367,928
Claims priority, application Great Britain, May 31, 1963, 21,869
2 Claims. (Cl. 60—39.28)

This invention relates to liquid-fuel supply systems for gas turbines and has for an object to provide an improved fuel system having means which automatically limit the fuel supply during the acceleration period to avoid conditions such as compressor surge and overheating. The invention uses a fuel system of the kind in which the delivery of an engine-driven fixed-displacement fuel pump is distributed by a distributor slide valve exposing at each position two ports, one leading to the engine burners and the other to a return line, in such manner that the total of the two areas is constant and each area varies as a linear function of the displacement of the valve, and in which the return line contains a throttle valve known as link valve, which is operated by the opposed actions of the pressures at the outlet side of each of the two ports in such manner as to keep the two pressures equal.

According to the present invention in a fuel system of the kind specified the displacement of the distributor valve is controlled by a first bellows acted-upon, against spring pressure, by the absolute pressure at the air intake of the combustion-air compressor while a second bellows, acted-upon, against a spring load, by the difference between compressor-delivery pressure and air-intake pressure, is arranged, when the ratio of absolute delivery pressure to absolute intake pressure exceeds a predetermined value, to strike an abutment movable with the valve so that at pressure ratios exceeding this value the further displacement of the distributor valve is proportional to compressor delivery pressure.

Figure 1:
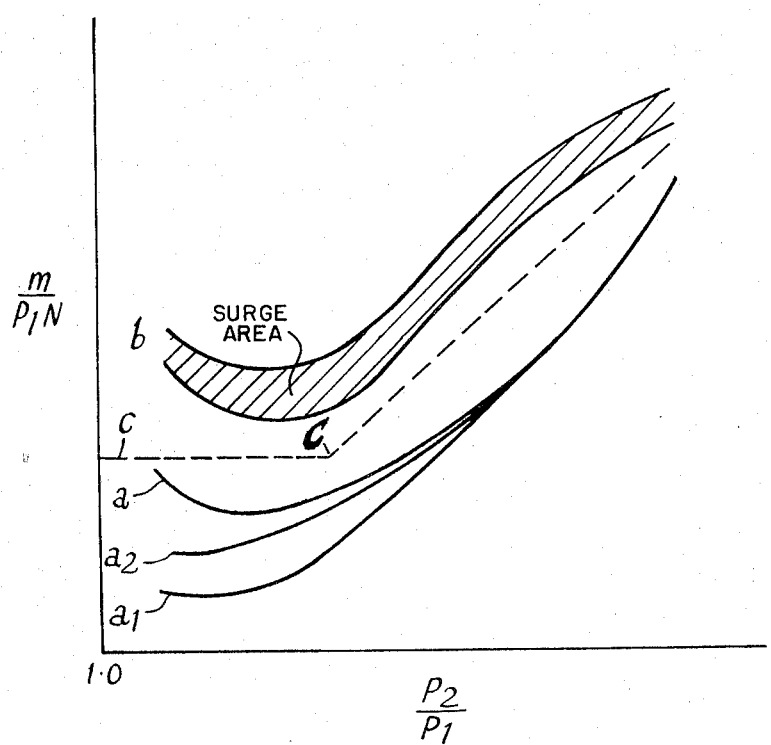

In the accompanying drawings,

FIGURE 1 is a diagram in which the mass flow of fuel per revolution $m/N$ for a given compressor intake pressure $P_1$ is plotted over the pressure ratio $P_2/P_1$, $P_2$ being the compressor delivery pressure.

Figure 2:
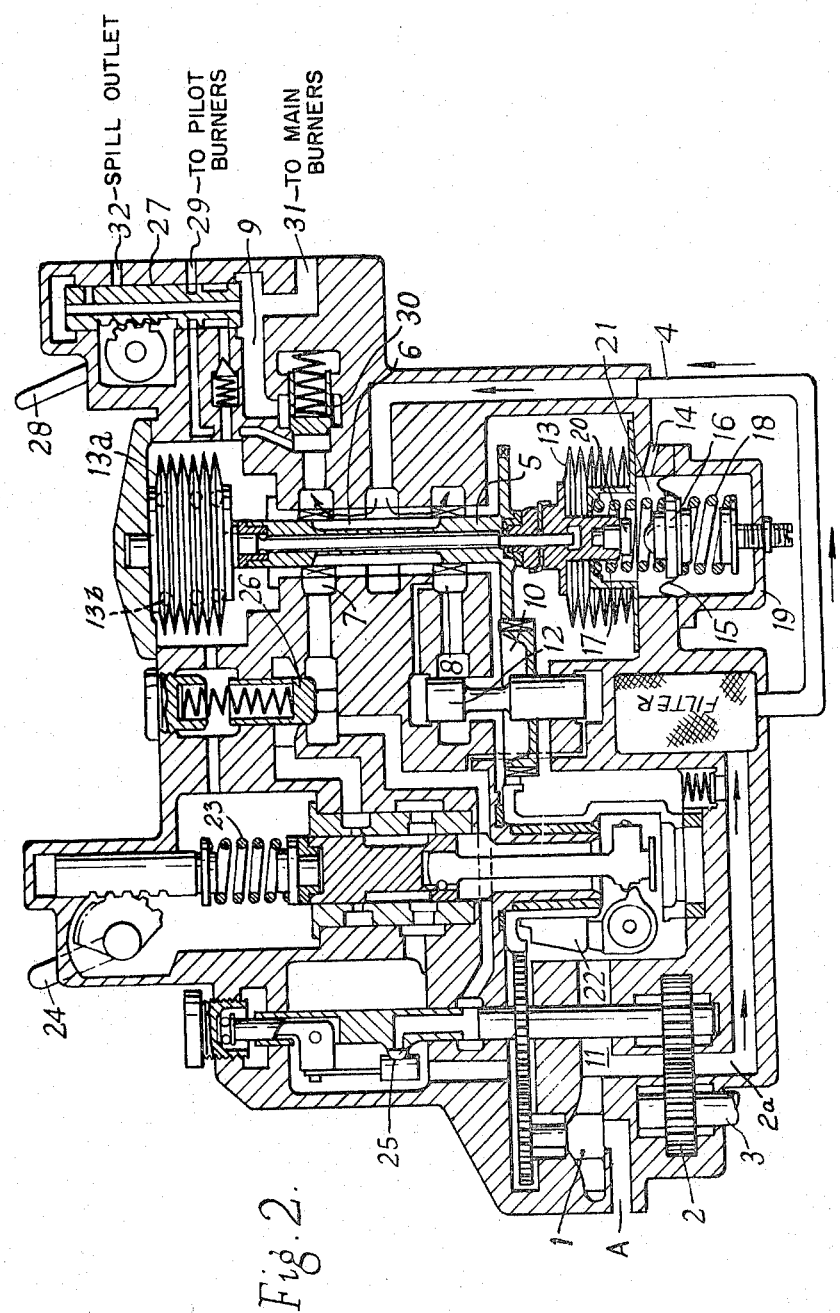

FIGURE 2 is a somewhat diagrammatic axial section of one form of fuel-supply system incorporating the invention, and In FIGURE 1 curves $a$, $a1$, and $a2$ are steady-state fuel-flow lines, curve $a$ relating to $P_1/P_1' = 1.0$, curve $a1$ to $P_1/P_1'$ equals 1.5, and curve $a2$ to an intermediate value of $P_1/P_1'$ wherein $P_1$ is the total pressure at compressor intake and $P_1$ is the static pressure at compressor intake, $P_2$ being similarly the total pressure at compressor delivery. Area $b$ is the so-called surge-boundary region. In order to ensure satisfactory acceleration conditions of the turbine, the fuel flow must lie between curve $a$ and area $b$, a curve as closely as possible approximating the lower limit of the surge boundary area $b$ being desirable.

The present invention proposes to achieve approximation by a characteristic substantially as shown at $c$, which, up to a point C corresponding to a predetermined value of $P_2/P_1$, supplies a mass flow per revolution $m/N$ which is proportional to $P_1$ and independent of $P_2$ (so that $m/NP_1$ is constant as represented by the horizontal part of the characteristic $c$), and which for values of $P_2/P_1$ above the said value is proportional to $P_2$, so that the represented value $m/P_1N$, in which $m$ is the mass flow and N is engine speed, is proportional to $P_2/P_1$ and is therefore a constant-gradient portion of the characteristic as shown to the right of point C.

FIGURE 2 is a sectional elevation of one fuel-supply system incorporating the invention. Fuel from a tank enters at A and reaches, through a backing pump 1, a gear-type fuel pump 2 the shaft 3 of which is coupled to the turbine of a gas-turbine engine, not shown so that the pump 2 will at its outlet 2a deliver a fuel flow proportional to engine speed. This fuel flow is fed by a line 4 to a metering slide valve or distributor valve 5 having an annular chamber 6 which is confined between two lands. These lands cooperate respectively with two ports 7 and 8 which are designed to have linear area/travel characteristics and are so arranged that the total flow area presented to the pump flow is always constant irrespective of the position of the valve. Port 7 feeds the engine burners by a line 9, while port 8 communicates via a chamber 10 with a return line leading back to the inlet of the gear-type fuel pump 2. In order to make the distribution of the fuel flow between ports 7 and 8 proportional to the areas of these ports, a link valve 12, movable by the difference between the pressures at the downstream sides of ports 7 and 8, is arranged to constitute a variable throttle in the connection between port 8 and chamber 10 so as to maintain the downstream pressure at port 8 equal to that at port 7.

In order to cause the travel of slide valve 5 to be proportional to compressor air-intake pressure $P_1$ when the compression ratio $P_2/P_1$ is below a predetermined value, the valve is connected to a spring-loaded diaphragm-bellows arrangement comprising a bellows 13 to which air intake pressure is admitted at 14, acting in opposition to an evacuated bellows 13a of the same cross-sectional area, which is spring-loaded as indicated by a spring 13b, so that an increase in air-intake pressure $P_1$ tends to increase the share of flow reaching the burner line 9. In order now to cause this control to be replaced by one in proportion with compressor delivery pressure when the compression ratio exceeds the said predetermined value, a diaphragm 15 carrying a movable abutment 16 is provided, which co-operates with a pair of biasing springs 17 and 18, and which is acted upon by the excess of compressor delivery pressure acting in a chamber 19 over the air-intake pressure acting in a chamber 21 which communicates with the interior of bellows 13, to move from its illustrated position, in which the abutment 16 is spaced from an anvil 20 movable with the slide valve 5, towards the said anvil. When the compression ratio $P_2/P_1$ is below a predetermined value, the action of the compressor delivery pressure $P_2$ in chamber 19 will be merely to reduce the distance between abutment 16 and anvil 20, but when this predetermined value is reached, the abutment 16 strikes the anvil 20 so that upon any further increase in $P_2/P_1$ the forces of bellows 13 and diaphragm 15, as modified by the various resilient elements provided, act additively upon the slide valve 5 to move the latter towards a position in which the valve allows a greater share of the fuel flow to reach the burners. The effective area of the diaphragm 15 is made equal to the effective area of the bellows 13 and 13a so that in effect, for values of $P_2/P_1$ in excess of the said predetermined value, the position of the slide valve 5 is exclusively determined by the compressor delivery pressure $P_2$.

The drawing additionally shows a number of elements which are not essentially involved in the operation of the present invention, and which include an all-speed governor having governor weights 22 and a loading spring 23 which is adjustable via a rack-and-pinion drive from a handle 24. This governor causes some of the liquid from port 7 of the valve 5 to be returned to pump-inlet line 4 when the engine reaches a pre-set speed, while an overspeed governor 25, which is of the so-called reed type, opens a further by-pass when a safety-limit speed is approached. A spring-loaded minimum-flow valve 26 serves to prevent the governors from causing extinction of the flame; it acts by cutting-off communication between the port 7 and these governors unless the flow to the burners, and thus the pressure at port 7, reaches a predetermined minimum.

Finally, a shut-off cock 27 operable by a handle 26 is operable from the illustrated position, in which fuel is supplied direct to the pilot burners by a line 29 and, under the control of a pressurizing valve 30, to the main burners by a line 31, via a position in which the supply to the pilot burners is cut off while maintaining the flow to the main burners, to a shut-off position. When the cock 27 is in the shut-off position, the connection between the delivery line 7 and the main-burner outlet 31 is also cut off while at the same time the main burners are placed into communication with a spill outlet 32, thus ensuring complete cessation of the fuel supply to the burners, even if there should be a small leakage from line 9 past the shut-off cock 27.

What we claim is:

1. A fuel-supply system for a gas-turbine engine including a combustion chamber equipped with burner means, a turbine rotor and an aerodynamic combustion-air compressor rotating with said rotor, said compressor having an air inlet and a delivery outlet, wherein the fuel-supply system comprises: a fixed-displacement fuel pump having a fuel-delivery outlet; means for drivingly connecting said pump to such engine; a distributor slide valve having an inlet connected to said fuel-delivery outlet, a first port for connection to the burner means of said engine, a second port for returning excess fuel to said pump, and a slide valve element movable between two terminal positions to vary the exposed areas of said ports, said valve element having an abutment, and said ports and valve element being so constructed that for any position to which the slide valve element is thus movable, the exposed area of each said port is a linear function of the distance of the valve element from one of said terminal positions and the sum of the exposed areas of said two ports is independent of the position of said slide valve element; a throttle valve in said return line; and means differentially responsive to the pressures at said two ports to so vary the position of said throttle valve as to equalise the pressures in said ports; means actuating the said slide valve element, said means including a first spring-loaded bellows acted-upon, against its spring loading, by the absolute pressure at the air intake of said compressor; and a second spring-loaded bellows acted-upon, against its spring loading, by the difference between the respective pressures at the delivery and intake of said compressor, said second bellows being arranged, when the ratio of absolute delivery pressure to absolute intake pressure exceeds a predetermined value, to strike, and move jointly with, the abutment of the slide valve element.

2. A fuel-supply system as claimed in claim 1, wherein the effective area of the second bellows is approximately equal to that of the first bellows.

References Cited by the Examiner
UNITED STATES PATENTS 2,668,415   2/1954   Lawrence  ---------- 60—39.28
2,668,416   2/1954   Lee  ---------------- 69—39.28

JULIUS E. WEST, *Primary Examiner.*